(12) United States Patent
Bhose (10) Patent No.: US 8,996,448 B2
(45) Date of Patent: Mar. 31, 2015

(54) METHOD AND SYSTEM FOR DETERMINING SKILL MATRIX

(75) Inventor: Rajarshi Bhose, West Bengal (IN)

(73) Assignee: Infosys Limited (IN)

( * ) Notice: Subject to any disclaimer, the term of this patent is extended or adjusted under 35 U.S.C. 154(b) by 855 days.

(21) Appl. No.: 13/173,148

(22) Filed: Jun. 30, 2011

(65) Prior Publication Data

US 2012/0284068 A1 Nov. 8, 2012

(30) Foreign Application Priority Data

May 2, 2011 (IN) .......................... 1506/CHE/2011

(51) Int. Cl.
G06F 17/00 (2006.01)
G06Q 10/10 (2012.01)

(52) U.S. Cl.
CPC ............ *G06Q 10/105* (2013.01); *G06Q 10/103* (2013.01)
USPC ........................................................ 707/600

(58) Field of Classification Search
CPC ................... G06F 17/30592; G06F 17/30598; G06F 17/30601
USPC ................... 707/600, 607, 608, 609
See application file for complete search history.

(56) References Cited

U.S. PATENT DOCUMENTS

| 7,882,549 B2 * | 2/2011 | Edwards et al. ................... 726/5 |
| 2004/0141003 A1 * | 7/2004 | Nivers et al. ................... 345/745 |
| 2009/0187975 A1 * | 7/2009 | Edwards et al. ................... 726/4 |

OTHER PUBLICATIONS

Ajita John et al, "Collaborative Tagging and Expertise in the Enterprise", May 22-26, 2006, Edinburgh, UK, 6 pages.*
Daniel Ramage et al, "Clustering the Tagged Web", Copyright 2008, ACM 978-1-60558-390-7, 10 pages.*
Hofgesang: "Relevance of Time Spent on Web Pages", Copyright 2006 ACM 1-59593-444-8, 8 pages.*

* cited by examiner

*Primary Examiner* — Rehana Perveen
*Assistant Examiner* — Loc Tran
(74) *Attorney, Agent, or Firm* — Cantor Colburn LLP (57) ABSTRACT

A method and a system for determining a skill matrix of an employee is provided. The method comprises analyzing the employee's folksonomic behavior and consequently creating the skill matrix of the employee. Folksonomy comprises creating one or more tags to annotate and categorize web content. The system includes a Tag Cloud Management Module, a Tag Cluster Generator Module and a Skill Matrix Generator Module. The Tag Cloud Management Module is configured to generate a tag cloud, wherein the tag cloud includes one or more tags created by the employee while browsing content of interest. The Tag Cluster Generator Module is configured to create one or more groups/clusters of one or more tags included in the tag cloud, based on one or more technologies related to the one or more tags. The Skill Matrix Generator Module is configured to analyze the created one or more clusters of tags to determine the skill matrix of the employee.

15 Claims, 4 Drawing Sheets

METHOD AND SYSTEM FOR DETERMINING SKILL MATRIX

FIELD OF INVENTION

The present invention is directed towards determination of an employee's skill matrix. More particularly, the present invention provides a method and a system for determining an employee's skill matrix by analyzing the employee's folksonomic behavior.

BACKGROUND OF THE INVENTION

Organizations with huge employee bases often find it difficult to allocate projects to employees corresponding to the employees' areas of interest and expertise. Due to lack of knowledge of an employee's areas of interest/expertise, project allocators, at times, allocate projects relating to a technology area which is only remotely related to the employee's preferred technology. This leads to valuable employee time being spent in obtaining training and affects the productivity of the employee. This also has a negative impact on the project timelines and, thereby, impacts the efficiency of the organization. Hence, there is need to determine and record the areas of expertise of each employee to improve the productivity and profitability of the entire organization.

Most organizations allow employees to browse the Internet for the purposes of enhancing/updating their technical skills. While browsing the Internet employees tend to visit web sites which pertain to their areas of interest. There is a tendency to store, annotate or tag a web page when an employee comes across any information of particular interest. Such behavior is popularly termed as folksonomic behavior. Typically, such employee generated web information is lost over a period of time and is not utilized for any purpose that contributes to enhancing the efficiency of the organization. Hence, there is a need to capture the tags or annotations created by employees while browsing web sites.

In light of above, there is need for a method and a system for analyzing the folksonomic behavior of employees and capture the tags, annotations, or bookmarks created by them for the purpose of determining the employees' areas of interest/expertise.

SUMMARY OF THE INVENTION

A computer-implemented method for determining a skill matrix of a user is provided. In various embodiment of the present invention, the computer-implemented method comprises authenticating, using a computing device, the user by validating his credentials. The credentials define at least one authorization detail of the user. The method further comprises generating, using a computing device, a tag cloud by accumulating one or more tags created by the authenticated user. The one or more tags describe the browsing actions of the user. Further, the method comprises classifying, using a computing device, the one or more tags accumulated in the tag cloud into one or more clusters of tags. The one or more tags are classified based on a predetermined machine learning clustering technique. Furthermore, the method comprises deriving, using a computing device, a plurality of attributes based on the analysis of the classified one or more clusters of tags. The method also comprises generating, using a computing device, a skill matrix of the user based on the derived plurality of attributes.

In an embodiment of the present invention, the computer-implemented method for authenticating the user further comprises receiving at least one authorization detail of the user. Further, the method comprises comparing the received at least one authorization detail of the user with the information pre-stored in an enterprise corporate directory. In an embodiment of the present invention, the at least one authorization detail includes at least one of user id and password. In an embodiment of the present invention, the one or more tags are bookmarks created to define a shortcut for enabling quick access to respective web contents.

In an embodiment of the present invention, the computer-implemented method for classifying each of the authenticated one or more tags further comprises identifying one or more technology domains corresponding to each of the one or more tags created by the user. The method further comprises creating one or more clusters of tags corresponding to each of the identified one or more technology domains. In an embodiment of the present invention, K-means clustering technique is used to classify the one or more tags into one or more clusters of tags.

In an embodiment of the present invention, the computer-implemented method for deriving the plurality of attributes further comprises identifying, using a computing device, one or more technology domains in which the user is active. The one or more technology domains are identified based on the classified one or more clusters of tags. Further, the method comprises evaluating, using a computing device, the number of one or more tags created by the user in each of the identified one or more technology domains. Furthermore, the method comprises determining, using a computing device, the number of one or more collaborative tags created by the user. The one or more collaborative tags refers to one or more tags created by other users corresponding to the identified one or more technology domains. The method also comprises computing, using a computing device, amount of time the user has spent in each of the identified one or more technology domains.

In an embodiment of the present invention, the computer-implemented method for deriving the plurality of attributes further comprises identifying a skill classification attribute based on the identified one or more technology domains. The method further comprises determining a skill motivation attribute based on the evaluated number of the one or more tags created by the user in each of the identified one or more technology domains. Further, the method comprises calculating a skill collaboration index attribute based on the determined number of the one or more collaborative tags created by the user in each of the identified one or more technology domains. The method also comprises evaluating a skill maturity attribute based on the calculated number of years the user has spent in each of the identified one or more technology domains. In an embodiment of the present invention, the skill matrix of the user comprises at least one of the skill classification attribute, the skill motivation attribute, the skill collaboration index attribute, and the skill maturity attribute.

In an embodiment of the present invention, the computer-implemented method for determining a skill matrix of a user further comprises creating, using a computing device, a graph to provide a visual representation of the skills of a user, by plotting the generated skill matrix of the user in an n-dimensional co-ordinate graph.

A system for determining a skill matrix of a user is provided. In various embodiment of the present invention, the system comprises a Tag Cloud Management Module, a Tag Cluster Generator Module, and a Skill Matrix Generator Module. The Tag Cloud Management Module, in communication with a processor, is configured to generate a tag cloud comprising one or more tags created by the user. The Tag Cluster Generator Module, in communication with the processor, is configured to create one or more clusters of tags based on a predetermined machine learning clustering technique. The Skill Matrix Generator Module, in communication with the processor, is configured to generate a skill matrix of a user based on the analysis of the one or more clusters of tags.

In an embodiment of the present invention, the Tag Cloud Management Module is further configured to authenticate the user based on at least one authorization detail of the user.

In an embodiment of the present invention, the Tag Cloud Management Module is further configured to associate the at least one authorization detail of the user to each of the one or more tags created by the user.

In an embodiment of the present invention, the Skill Matrix Generator Module comprises a Skill Classification Component, a Motivation Index Component, a Collaboration Index Component, and a Skill Maturity Component. The Skill Classification Component is configured to identify one or more technology domains in which the user is active, by analyzing the one or more clusters of tags. The Motivation Index Component is configured to determine the motivation of the user in the identified one or more technology domains by evaluating the number of one or more tags created by the user corresponding to the identified one or more technology domains. The Collaboration Index Component is configured to evaluate the collaboration of the user in the identified one or more technology domains by determining the number of one or more collaborative tags created by the user, wherein the one or more collaborative tags refers to one or more tags created by other users corresponding to the identified one or more technology domains. The Skill Maturity Component is configured to compute the amount of time the user has spent in each of the identified one or more technology domains.

In an embodiment of the present invention, the Skill Matrix Generator Module is further configured to create a graph, by plotting the generated skill matrix of a user in an n-dimensional co-ordinate graph.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A method and a system for determining an employee's skill matrix by analyzing the employee's folksonomic behavior are described herein. Folksonomy or collaborative tagging comprises collaboratively creating tags to annotate and categorize web content. Analysis of an employee's folksonomic behavior comprises analyzing the tag cloud generated by the employee while browsing content of interest. The tag cloud is a collection of all tags created by the employees of an organization.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
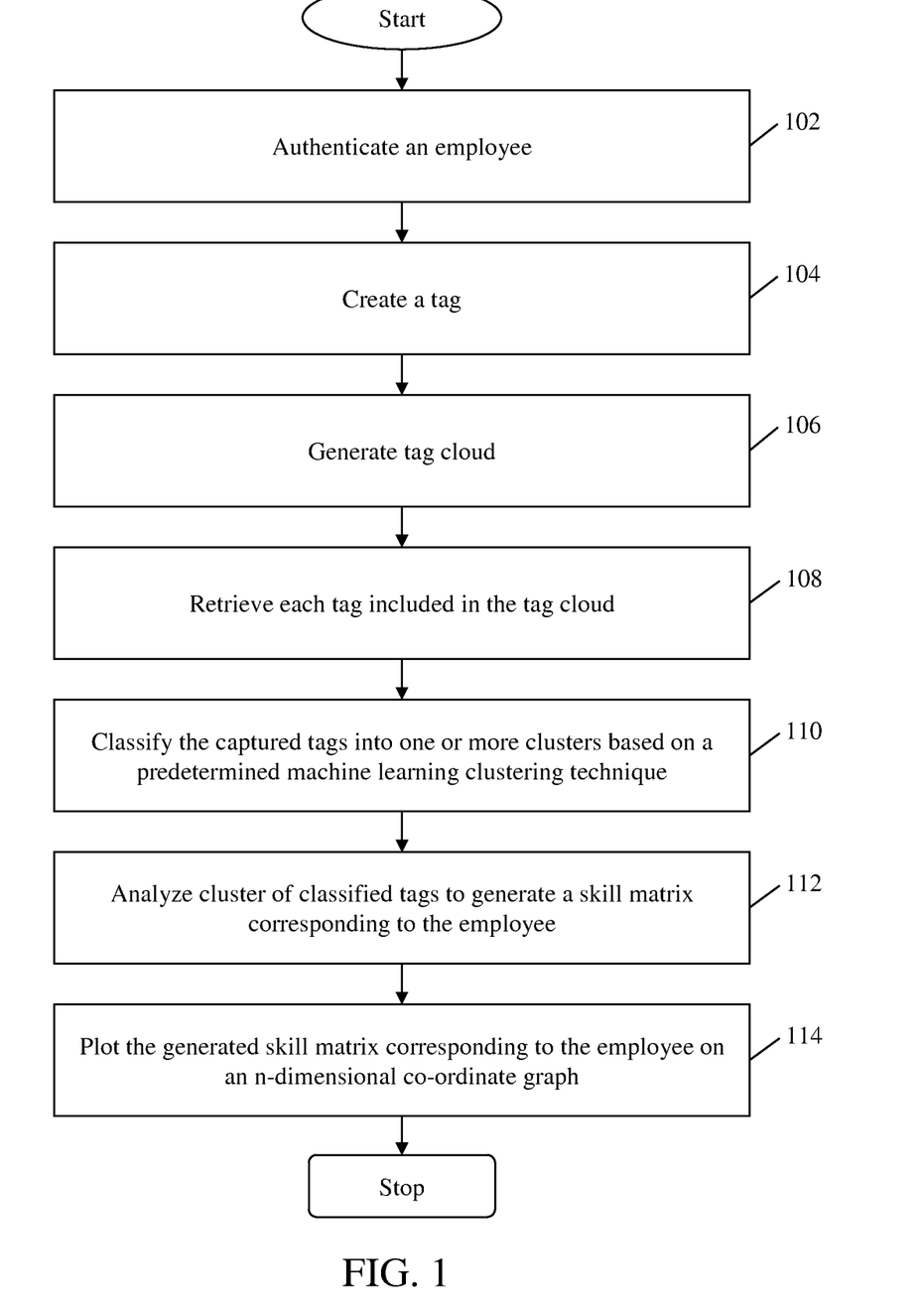
FIG. 1 is a flowchart illustrating a method for determining an employee's skill matrix, in accordance with an embodiment of the present invention.

FIG. 1 is a flowchart illustrating a method for determining an employee's skill matrix, in accordance with an embodiment of the present invention. Skill matrix denotes the functional strength of an employee based on at least one of his/her technical knowledge, experience and interest in one or more technical domains. In an organization, skill matrix of an employee is used to identify his core technical skills. Thereafter, the employer can allocate projects relevant to the employee based on the identified employee's technical skills.

At step 102, a user/employee is authenticated. In an embodiment of the present invention, the employee is prompted to enter his credential for authorization. In various embodiments of the present invention, credential(s) of an employee helps verify the identity of the employee, wherein the credential(s) of an employee may be his employee id, password and so forth. Once the employee provides his credentials, they are verified by the "Enterprise Security Directory" in conjunction with the enterprise corporate directory. In an embodiment of the present invention, the Enterprise Security Directory is a software which helps in providing enterprise authentication and authorization functionality. It may be apparent to a person skilled in the art that various Enterprise Security Directory softwares, such as Active Directory and Lightweight Directory Access Protocol (LDAP) can be used. In an exemplary embodiment of the present invention, an employee 'X' provides his credentials to the system. After which, the system verifies the identity of the employee 'X' with the help of the "Enterprise Security Directory" and the enterprise corporate directory. Once the employee is validated by the system, the employee 'X' is authorized to perform one or more tasks, such as browsing, creating bookmarks and so forth.

At step 104, the authenticated employee creates a tag. In an embodiment of the present invention, after the authentication of the employee at step 102, the authenticated employee creates one or more tags to bookmark (create shortcut) relevant web pages, for quick access, by using social bookmarking tools commonly known in the art. An employee generally bookmarks or tags a web page based on his interest on the content of the web page. Thereafter, each of the tags created along with URL comprises of employee credentials and his system information, derived from authenticated employee's profile (stored in the enterprise corporate directory). This information helps in identifying and recording details related to the employee/user.

In an embodiment of the present invention, Tags are defined as any label/keyword which denotes the content of the webpage. In an embodiment of the present invention, a tag may be created using one or more words referring to the content of the web page. In another embodiment of the present invention, a tag may be one or more words describing the broad technical category to which the content of the web page is related to. In an exemplary embodiment of the present invention, an employee tags a webpage related to "Infrastructure Virtualization" using various keywords including but not limited to virtualization, cloud computing, on demand scalability, resource virtualization, CPU-Network-Storage virtualization, live migration, cloud solution, Infrastructure virtualization, and Infrastructure as a Service (IaaS). Each of the created one or more tags are stored in a repository linked to an enterprise network. In an embodiment of the present invention, an employee can tag an existing tag created by another employee.

At step 106, a tag cloud is generated. In an embodiment of the present invention, after the authenticated employee has created one or more tags, the system collects all the created one or more tags into a tag cloud. In an embodiment of the present invention, the tag cloud is a repository which accumulates one or more tags created by the employee. In another embodiment of the present invention, the tag cloud is a collection of all the tags created by all the employees of the organization. In various embodiments of the present invention, the tag cloud is linked with the repository of the enterprise network.

At step 108, each tag contained in the tag cloud is retrieved. In an embodiment of the present invention, the tag cloud contains tags created by various employees of the organization. The tags retrieved from the tag cloud are grouped corresponding to the employees who have created the tags. In yet another embodiment of the present invention, the collection of tags created by an employee, whose skill matrix is being determined, is retrieved from the tag cloud.

At step 110, the tags are classified into one or more clusters based on a predetermined machine learning clustering technique. In an embodiment of the present invention, each of the tags grouped with respect to employees are further classified based on identified technologies derived from tags. In an embodiment of the present invention, a machine learning clustering technique defines the methodology to create a group/cluster of associated elements with minimal human intervention. In an exemplary embodiment of the present invention, a machine learning clustering technique, such as 'K-means clustering technique' is used to categorize the tags into various clusters of specific technologies. In another exemplary embodiment of the present invention, tags related to 'Cloud Computing' and 'Java' are identified by the 'K-means clustering technique' and are then stored as different clusters of tags corresponding to a particular employee.

At step 112, clusters of classified tags are analyzed to generate a skill matrix corresponding to an employee. In an embodiment of the present invention, each cluster of tags specific to a particular technology domain corresponding to an employee is analyzed. The analysis of the cluster of tags determines the core technical skills of an employee in a particular technology domain i.e. skill matrix of an employee is determined. The skill matrix also highlights the technical skills of an employee in a particular technology domain with respect to his peers.

In an embodiment of the present invention, a skill matrix includes four attributes namely a 'Skill Classification Attribute', a 'Skill Maturity Attribute', a 'Collaboration Index Attribute' and a 'Motivation Index Attribute'. The skill matrix is derived as a function including each of the four attributes and may be represented as:

Skill Matrix (SM)=f (Skill Classification Attribute, Skill Maturity Attribute, Collaboration Index Attribute, Motivation Index Attribute)

The Skill Classification Attribute is derived based on the technology domain identified by analyzing the clusters of tags corresponding to an employee. For example, in case the analyzed cluster of tags, corresponding to an employee, is found to be related to the technology domain of 'Cloud Computing', the Skill Classification Attribute of the employee is defined as 'Cloud Computing'.

The Skill Maturity Attribute represents the amount of time an employee has already spent on a particular technology domain, wherein the particular technology domain is identified by analyzing the cluster of tags corresponding to an employee. For example, in case the employee has spent 5 years in the domain of 'Cloud Computing', the Skill Maturity Attribute is defined as '5'.

The Collaboration Index Attribute is calculated by evaluating the cluster of tags to identify the number of collaborative tags created by an employee, wherein the collaborative tags are one or more tags which refers to the tags created by other employees in a particular technology domain. Therefore, a greater number of collaborative tags created by an employee indicate a higher collaboration of the employee in the particular technology domain. In an exemplary embodiment of the present invention, a range of value, such as 0 to 10, may be defined to represent the degree of collaboration demonstrated by an employee in a particular technology domain, wherein 0 represents no collaboration and 10 represents very high collaboration of the employee in the particular technology domain.

The Motivation Index Attribute is determined by analyzing the cluster of tags to identify the number of tags created by the employee in a particular technology domain. Hence, a greater number of tags created by an employee in a particular technology domain represent a higher motivation of the employee in the particular technology domain. In an exemplary embodiment of the present invention, a range of value, such as 0 to 10, may be defined to represent the degree of motivation demonstrated by an employee in a particular technology domain, wherein '0' represents no motivation and '10' represents very high motivation of the employee in the particular technology domain. The skill matrix is further explained in conjunction with FIG. 3.

At step 114, the generated skill matrix of an employee is plotted on an n-dimensional co-ordinate graph. In an embodiment of the present invention, each of the axes of the graph corresponds to the respective four attributes of the skill matrix. In an exemplary embodiment of the present invention, each attribute in the skill matrix is calculated by analyzing the cluster of tags corresponding to the employee, as explained in step 112. The calculated values corresponding to each attribute of the skill matrix represent a co-ordinate value of the employee's skill matrix. The employee's skill matrix is thereafter plotted in the n-dimensional co-ordinate graph. The position of the co-ordinate value in the graph corresponds to the visual interpretation of the technical skill of the employee. The n-dimensional graph is further explained in conjunction with FIG. 4.

Figure 2:
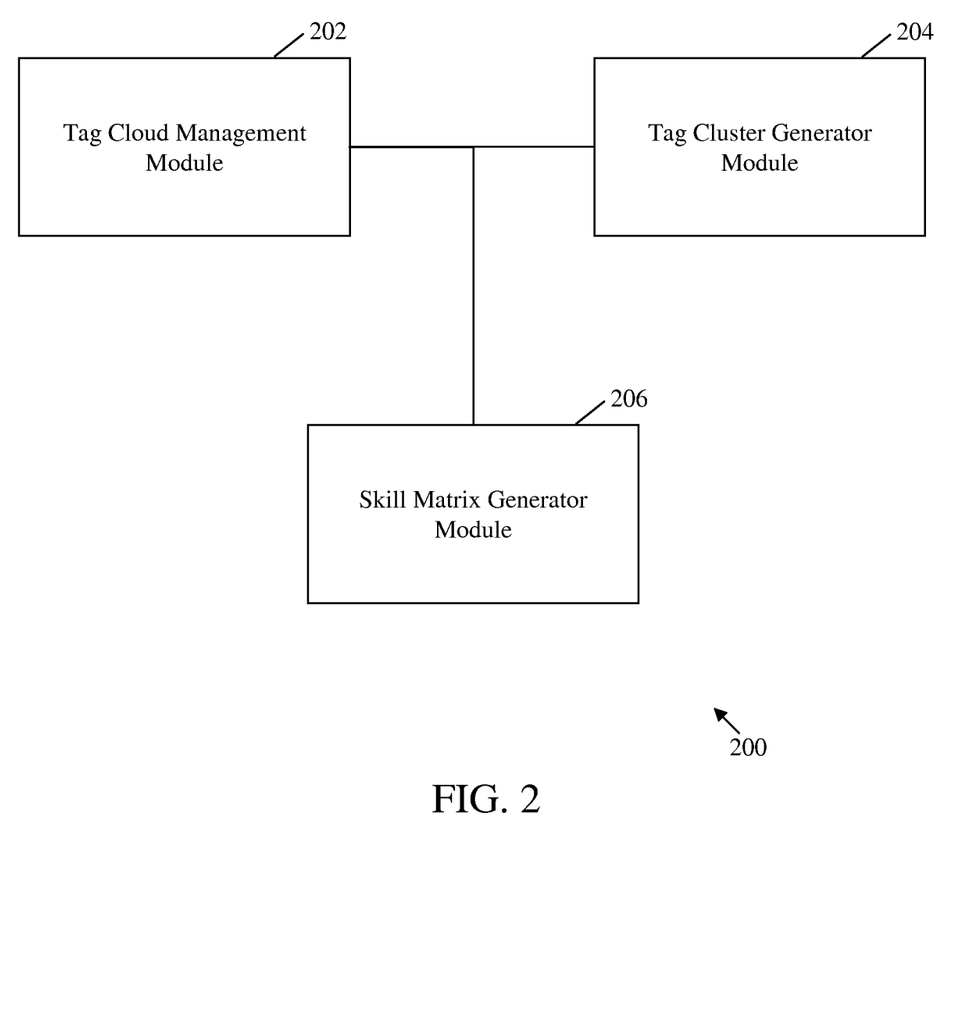
FIG. 2 is a block diagram depicting a system for determining an employee's skill matrix, in accordance with an embodiment of the present invention.

FIG. 2 is a block diagram depicting a system for determining an employee's skill matrix, in accordance with an embodiment of the present invention. The System 200 includes a Tag Cloud Management Module 202, a Tag Cluster Generator Module 204 and a Skill Matrix Generator Module 206.

System 200 determines an employee's skill matrix by analyzing the folksonomic behavior of the employee. As explained earlier in FIG. 1, an employee creates one or more tags corresponding to the web pages related to a technology domain of his interest. The one or more tags are further stored in a group known as a tag cloud. Subsequently, the tag cloud is analyzed to derive the skill matrix of an employee.

The Tag Cloud Management Module 202 manages the one or more tags created by an employee. In an embodiment of the present invention, the Tag Cloud Management Module 202 authenticates an employee/user to access the system. In an embodiment of the present invention, the Tag Cloud Management Module 202 prompts the employee to provide his credentials. After which the Tag Cloud Management Module 202 verifies the identity of the employee in conjunction with "Enterprise Security Directory" and the enterprise corporate directory (as described earlier in FIG. 1). Thereafter, the Tag Cloud Management Module 202 enables the authenticated employee/user to create one or more tags using a bookmarking tool. The created one or more tags along with the information of the employee who has created it are stored at a tag cloud. In an exemplary embodiment of the present invention, the credentials of an employee include but are not limited to an employee id, employee initial, and security key. The authorization of the employee enables the system to track the one or more activities, such as browsing and creating tags, performed by the employee.

The Tag Cluster Generator Module 204 creates clusters from the generated tag cloud corresponding to an employee. In an embodiment of the present invention, a machine learning clustering technique is used to create one or more clusters of tags from a tag cloud. The machine learning clustering technique groups' tags related to a particular technology domain corresponding to an employee. In an exemplary embodiment of the present invention, the Tag Cluster Generator Module 204 uses 'K-Means Clustering technique' to create one or more clusters of tags derived from the tag cloud corresponding to an employee. In case, a tag cloud includes tags related to the technology domain of 'Cloud Computing' and 'Financial Application', the Tag Cluster Generator Module 204 will create two clusters of tags each corresponding to the respective technology.

The Skill Matrix Generator Module 206 analyzes the tag clusters to generate a skill matrix corresponding to each employee. In an embodiment of the present invention, a skill matrix is a function of four attributes, i.e. a 'Skill Classification Attribute', a 'Skill Maturity Attribute', a 'Collaboration Index Attribute', and a 'Motivation Index Attribute' as illustrated in FIG. 1. The Skill Matrix Generator Module 206 derives a function describing the four attributes of the skill matrix. The Skill Matrix Generator Module 206 is further explained in conjunction with FIG. 3. In an embodiment of the present invention, the function derived represents the skill matrix of an employee. Thereafter, the derived function is plotted in an n-dimensional co-ordinate graph, which is further explained in conjunction with FIG. 4.

Figure 3:
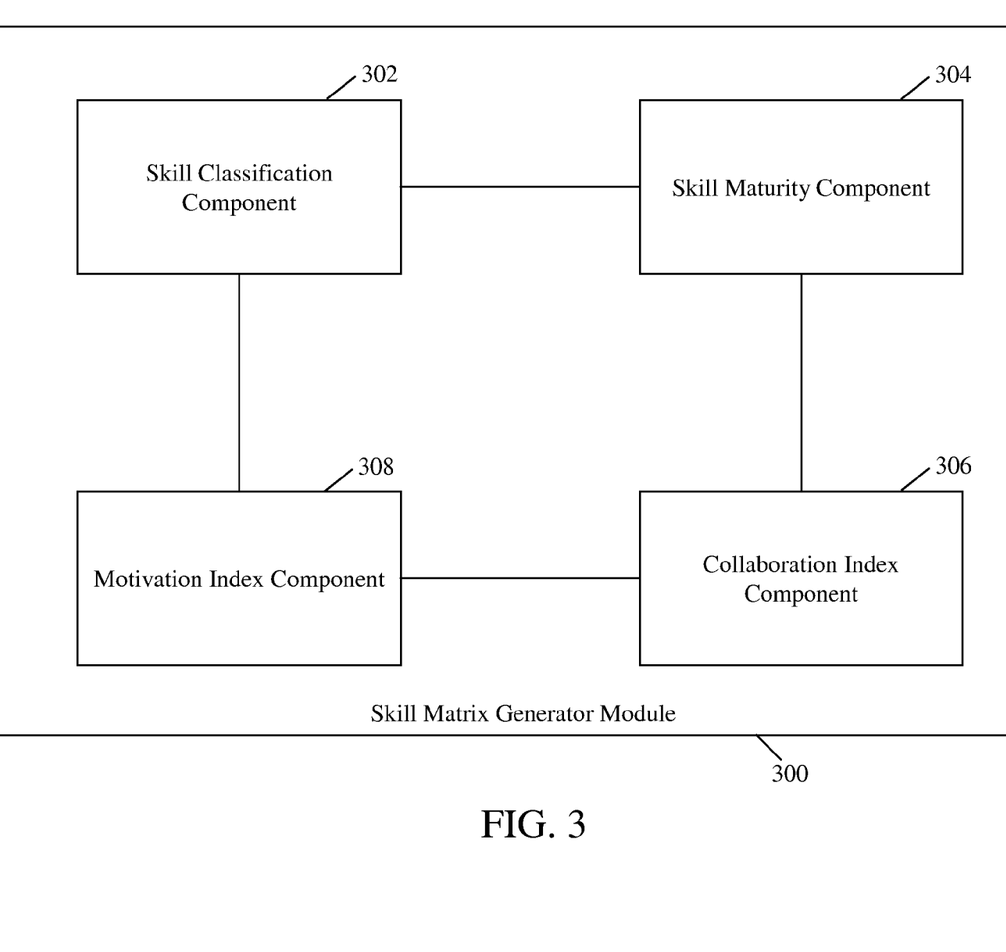
FIG. 3 is a block diagram of a skill matrix generator module, in accordance with an embodiment of the present invention.

FIG. 3 is a block diagram of a skill matrix generator module 300, in accordance with an embodiment of the present invention.

The Skill Matrix Generator Module 300 is configured to define an employee's area of specialization/expertise. In an embodiment of the present invention, the Skill Matrix Generator Module 300 categorizes employees either as an expert, a beginner, or a novice, based on the employee's expertise in a technology domain. The Skill Matrix Generator Module 300 generates a 'skill matrix' corresponding to an employee, which in turn identifies the core technical skills of the employee. The skill matrix, as explained earlier in FIG. 1, is derived as a function including each of the four attributes and in an exemplary embodiment of the present invention, may be represented as:

Skill Matrix (SM)=f (Skill Classification Attribute, Skill Maturity Attribute, Collaboration Index Attribute, Motivation Index Attribute)

The Skill Matrix Generator Module 300 includes a Skill Classification Component 302, a Skill Maturity Component 304, a Collaboration Index Component 306, and a Motivation Index Component 308.

The Skill Classification Component 302 identifies the technology in which the employee is active and regularly visits web pages in a particular technology domain. In an embodiment of the present invention, the Skill Classification Component 302 in conjunction with the Tag Cloud Management Module 202 (FIG. 2) and the Tag Cluster Generator Module 204 (FIG. 2) identifies the respective technical categories associated with each of the cluster of tags, corresponding to an employee. In an exemplary embodiment of the present invention, various tags relating to 'Cloud Computing' and 'Financial Application' are clustered into respective technology clusters defined as a 'Cloud Computing' cluster and a 'Financial Application' cluster. After which, technology domain related to each of the cluster is stored independently. Furthermore, the respective skill matrices are calculated for each of the identified technology domain corresponding to the employee. It may be apparent to a person skilled in the art that various combination of assignment may be used based on the requirements of an organization.

The Skill Maturity Component 304 computes the amount of time (in number of years or hours) that an employee has invested in a particular technology domain, wherein the particular technology domain is identified based on the analysis of the cluster of tags. In an embodiment of the present invention, the amount of time (in years or hours) an employee has worked in a particular technology domain is stored as the 'Skill Maturity Attribute' corresponding to the particular technology domain. In various embodiment of the present invention, it is assumed that the number of years/hours an employee spends in a technology is directly proportional to an employee's expertise/skill maturity in the particular technology domain, i.e. higher values of the 'Skill Maturity Attribute' indicates that the employee is more advanced in the particular technology domain. The Skill Maturity Component 304 determines the number of year invested by an employee with respect to the technology denoted as the 'Skill Classification Attribute', identified by the Skill Classification Component 302. In an exemplary embodiment of the present invention, if an employee has spend 10 years in the domain of 'Cloud Computing', then the 'Skill Maturity Attribute' is defined as 10 corresponding to the respective 'Skill Classification Attribute' (Cloud Computing).

The Collaboration Index Component 306 determines an employee's collaborative or contributive activities in an organization with respect to a particular technology domain. In an embodiment of the present invention, the Collaboration Index Component 306 calculates a count of an employee's collaborative tags, i.e. tags which refers to tags created by other employees in a particular technology domain/area. In an exemplary embodiment of the present invention, the calculated count can be denoted as the 'Collaborative Index Attribute' of the skill matrix of an employee. In another exemplary embodiment of the present invention, the count of an employee's collaborative tags is measured relative to the total number of tags created by the employee. The relative value calculated is then assigned as the 'Collaborative Index Attribute' of the employee in the respective technology. For example, the result is measured in a scale ranging from 0 to 10, where '0' represent an employee who refers to those links created by other employees rarely and is least contributive and '10' represents an employee who regularly refers to those links created by other employees and is highly contributive. The 'Collaborative Index Attribute' determines the collaborative behavior of an employee with other employees. Therefore, higher number of linkages between tags in a particular technology domain corresponds to greater amount of collaboration between the employees. In addition, collaborative tagging by an employee may also be used to ascertain the authenticity of the tagged information, i.e. an employee will create a collaborative tag to an existing tag only if the existing tag is valid.

The Motivation index component 308 measures an employee's motivation in a particular technology domain. In an embodiment of the present invention, the Motivation index component 308 analyzes the cluster of tags corresponding to an employee to calculate the number of tags created by the employee in a particular technology domain. The calculated number of tags corresponding to a specific technology is further denoted as 'Motivation Index Attribute'. In an exemplary embodiment of the present invention, the 'Motivation Index Attribute' of the employee is stored as a relative number on a scale of 0-10, wherein a predefined number of tags (10) may be assigned a unit value '1' in the scale, i.e. the unit of measurement may be a factor of 10. Thus, in case an employee/user creates 10 tags, the unit will be 1, for 20 tags its 2 and so forth. In another embodiment of the present invention, the number of tags created by the employee is compared to the number of maximum tags created by the employee. The relative results of the employee is then ranked in a scale ranging from 0 to 10, wherein '0' denotes an employee who is least motivated in a particular technology domain and '10' denotes an employee who is highly motivated in particular technology domain. The ascertained numerical value is then stored as the 'Motivation Index Attribute' of the employee. Therefore, higher the number of tags, the greater motivation of the employee in a particular technology domain.

In an exemplary embodiment of the present invention, each of the four attribute is used to define the skill matrix of an employee. In an exemplary embodiment of the present invention, skill matrix of an employee can be denoted as:

Skill Matrix (SM)=f({Cloud Computing→Skill Classification Attribute}, {10→Skill Maturity Attribute}, {9→Collaboration Index Attribute}, {10→Motivation Index Attribute})

The above skill matrix function outlines the skill matrix of an employee who has created majority of tags in the technology/domain of 'Cloud Computing' (Skill Classification Attribute). The Skill Maturity Attribute denoted as '10' implies that the employee has spent 10 years in the field of 'Cloud Computing'. The Collaboration Index Attribute of the employee is denoted as '9', which implies that in a scaled range defined from 0 to 10, the employee is highly contributive. Similarly, Motivation Index Attribute of the employee denoted as 10, implies that the employee has created the maximum number of tags in the field of cloud computing. In an embodiment of the present invention, the 'Collaboration Index Attribute' and the 'Motivation Index Attribute' are measured in a scale ranging from 0 to 10, wherein 0 is the least value and 10 being the highest. The calculation of the measured value for each of the attribute is further explained in conjunction with FIG. 1.

In an embodiment of the present invention, the derived skill matrix is used to establish the technical expertise of an employee using a visual tool, such as an n-dimensional co-ordinate graph. In an exemplary embodiment of the present invention, the skill matrix denotes a co-ordinate value corresponding to an employee. The co-ordinate value can be further plotted in an n-dimensional co-ordinate geometry graph to visually determine the expertise of the employee. The n-dimensional co-ordinate graph is further explained in conjunction with FIG. 4.

Figure 4:
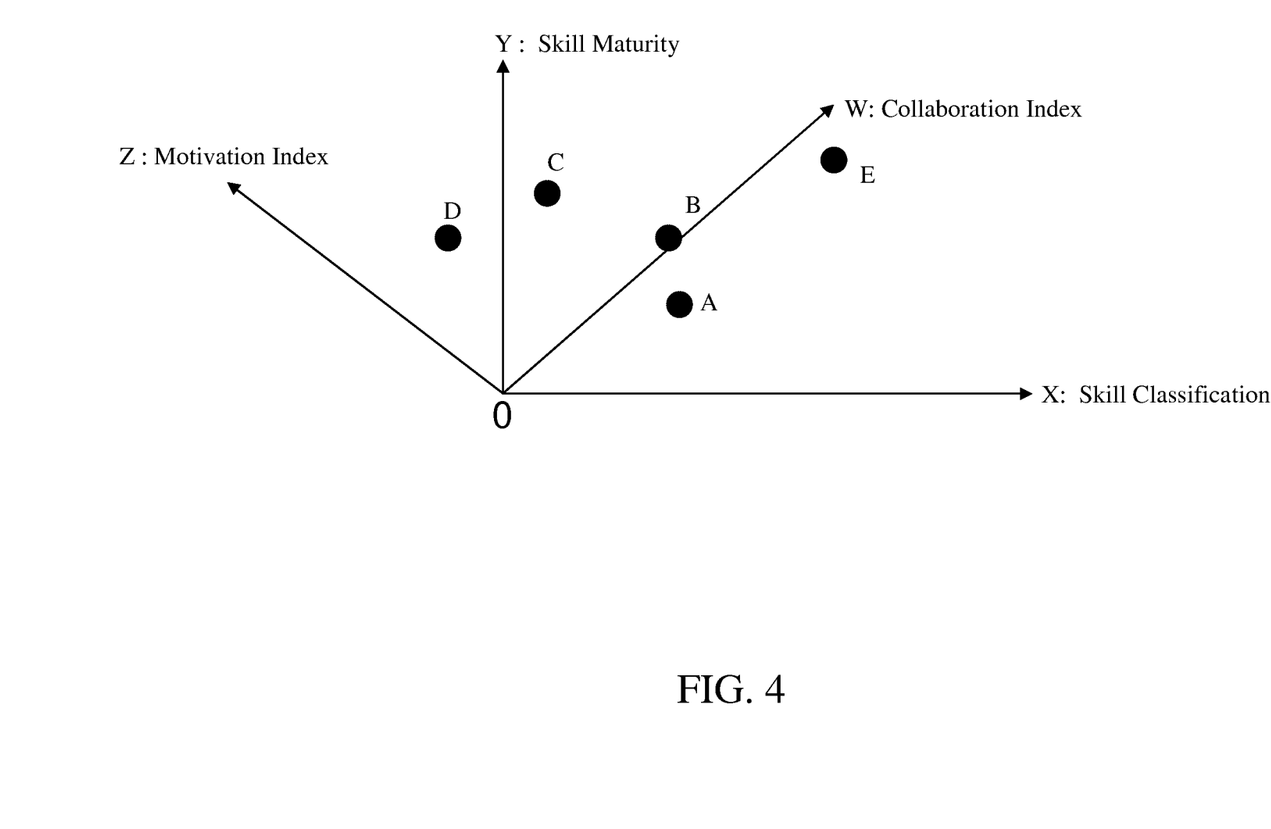
FIG. 4 is an exemplary embodiment of the present invention illustrating an n-dimensional skill matrix graph.

FIG. 4 is an exemplary embodiment of the present invention illustrating an n-dimensional co-ordinate skill matrix graph. The n-dimensional co-ordinate skill matrix graph is used to visually derive the skill/expertise of an employee. In an embodiment of the present invention, each axis of the n-dimensional co-ordinate skill matrix graph denotes each attribute of the skill matrix, i.e. the axes of the n-dimensional skill matrix graph are 'Skill Classification Attribute', 'Skill Maturity Attribute', 'Collaboration Index Attribute', and 'Motivation Index Attribute'. Each axis of the graph is further denoted as X, Y, W, and Z respectively.

As explained in conjunction with FIG. 1 and FIG. 3, the skill matrix describes a function outlining the four attributes. Each of the attributes is further allotted a numerical value which is used to plot the skill matrix point in the n-dimensional co-ordinate skill matrix graph. The methodology to calculate the numerical value corresponding to an attribute is further explained in conjunction with FIG. 1 and FIG. 3. In an exemplary embodiment of the present invention, each axis can be defined with a range of value describing the minimum value and the maximum value of the axis i.e. a range from 0 to 10, which implies that the value of each of the attributes ranges from 0 to 10. In another exemplary embodiment of the present invention, each axis can be defined with a range of value from 0 to n. It may be apparent to a person skilled in the art that increase in the range of values (for the respective axis) will improve the efficiency of the system while involving greater computational power in contrast to a system supporting a lower range of values for the respective axis. Further, each of the attributes included in the skill matrix is an independent attribute, i.e. each of the attributes can be marked independently as a point in an n-dimensional skill matrix graph, for example sample points plotted in the graph may be SM (Cloud computing, 1, 0, 0), SM (Visual Basic, 0,5,0), and SM (Java, 0,0,9).

In an embodiment of the present invention, the skill matrix of an employee is plotted as a point, such as A, (FIG. 4), in the graph which in turn describes the skill of an employee with respect to a particular technology domain. In an embodiment of the present invention, the distance of the point (A) from the origin determines the skill level of the employee in the particular technology domain. The graph provides a visual tool for determining the level of interest/expertise of the employees (A, B, C, D, and E). The respective points corresponding to each employee are generated after analyzing their respective tag clouds for the targeted technology. The exact position of an employee on the graph provides an understanding of an employee's level of maturity, level of motivation, and level of collaboration with other employees, in the respective technology. In an exemplary embodiment of the present invention, a chart can be generated containing the skill level of each employee of an organization in a specific technology. The generated chart provides a bird's eye view of the distribution of employee's skill level in the specific technology and further helps the organization to identify the employee skilled to work on a specific technology.

Therefore the present invention provides method and a system for determining an employee's skill matrix by analyzing the employee's folksonomic behavior. The method and system of the present invention may be employed for obtaining a measure of an employee's skill level, motivation level as well as the employee's area of interest and can be used by managers to allocate projects pertaining to the areas of interest/skill to the employee, thereby increasing the efficiency of the employee. Hence, the method and system of the present invention enables increasing the productivity of an employee and thereby the corresponding organization. Further, the analysis of folksonomic behavior of employees by using the present invention enables determination of other parameters such as subject matter experts as well.

Various embodiments of the present invention, may be implemented via one or more computer systems. The computer system is not intended to suggest any limitation as to scope of use or functionality of described embodiments. The computer system includes at least one processing unit and memory. The processing unit executes computer-executable instructions and may be a real or a virtual processor. In an embodiment of the present invention, the memory may store software for implementing various embodiments of the present invention.

The present invention may suitably be embodied as a computer program product for use with a computer system. The method described herein is typically implemented as a computer program product, comprising a set of program instructions for controlling a computer or similar device. The set of program instructions may be a series of computer readable instructions fixed on a tangible medium, such as a computer readable storage medium, for example, diskette, CD-ROM, ROM, or hard disk, or transmittable to a computer system, via a modem or other interface device, over either a tangible medium, including but not limited to optical or analogue communications lines. The implementation of the invention as a computer program product may be in an intangible form using wireless techniques, including but not limited to microwave, infrared or other transmission techniques These instructions can be supplied preloaded into a system or recorded on a storage medium such as a CD-ROM, or made available for downloading over a network such as the Internet or a mobile telephone network. The series of computer readable instructions may embody all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

While the exemplary embodiments of the present invention are described and illustrated herein, it will be appreciated that they are merely illustrative. It will be understood by those skilled in the art that various changes in form and detail may be made therein without departing from or offending the spirit and scope of the invention.

What is claimed is:

1. A computer-implemented method for determining a skill matrix of a user, the method comprising the steps of:
   a. authenticating, using a computing device, the user by validating his credentials, wherein credentials define at least one authorization detail of the user;
   b. generating, using a computing device, a tag cloud by accumulating one or more tags created by the authenticated user, wherein the one or more tags comprise the credentials of the user and a description of the browsing actions of the user;
   c. recording details related to the user by using the credentials;
   d. classifying, using a computing device, the one or more tags accumulated in the tag cloud into one or more clusters of tags, based on a predetermined machine learning clustering technique;
   e. deriving, using a computing device, a plurality of attributes based on the analysis of the classified one or more clusters of tags;
   f. calculating a count for each of the derived attributes, the count being calculated based on at least one of:
      (i) amount of time spent by the user in respective technology domain, and
      (ii) number of linkages between tags created b the user and tags created by a plurality of other users; and
   g. generating, using a computing device, a skill matrix of the user based on the count of each of the derived plurality of attributes and on the recorded details of the user.

2. The computer-implemented method of claim 1, wherein authenticating the user further comprises:
   a. receiving at least one authorization detail of the user; and
   b. comparing the received at least one authorization detail of the user with the information pre-stored in an enterprise corporate directory.

3. The computer-implemented method of claim 2, wherein the at least one authorization detail includes at least one of user id and password.

4. The computer-implemented method of claim 1, wherein the one or more tags are bookmarks created to define a shortcut for enabling quick access to respective web contents.

5. The computer-implemented method of claim 1, wherein classifying each of the authenticated one or more tags further comprises:
   a. identifying one or more technology domains corresponding to each of the one or more tags created by the user; and
   b. creating one or more clusters of tags corresponding to each of the identified one or more technology domains.

6. The computer-implemented method of claim 1, wherein K-means clustering technique is used to classify the one or more tags into one or more clusters of tags.

7. The computer-implemented method of claim 1, wherein deriving the plurality of attributes further comprises:
   a. identifying, using a computing device, one or more technology domains in which the user is active, based on the classified one or more clusters of tags;
   b. evaluating, using a computing device, the number of one or more tags created by the user in each of the identified one or more technology domains;
   c. determining, using a computing device, the number of one or more collaborative tags created by the user, wherein the one or more collaborative tags refers to one or more tags created by other users corresponding to the identified one or more technology domains; and
   d. computing, using a computing device, amount of time the user has spent in each of the identified one or more technology domains.

8. The computer-implemented method of claim 7, wherein deriving the plurality of attributes further comprises:

a. identifying a skill classification attribute based on the identified one or more technology domains;

b. determining a skill motivation attribute based on the evaluated number of the one or more tags created by the user in each of the identified one or more technology domains;

c. calculating a skill collaboration index attribute based on the determined number of the one or more collaborative tags created by the user in each of the identified one or more technology domains; and d. evaluating a skill maturity attribute based on the calculated number of years the user has spent in each of the identified one or more technology domains.

9. The computer-implemented method of claim 8, wherein the skill matrix of the user comprises at least one of the skill classification attribute, the skill motivation attribute, the skill collaboration index attribute, and the skill maturity attribute.

10. The computer-implemented method of claim 1 further comprising creating, using a computing device, a graph to provide a visual representation of the skills of a user, by plotting the generated skill matrix of the user in an n-dimensional co-ordinate graph.

11. A system for determining a skill matrix of a user, the system comprising:

a memory for storing computer-executable instructions;

a processor executing the computer-executable instructions for configuring:

a. a Tag Cloud Management Module for generating, a tag cloud comprising one or more tags created by the user, the one or more tags comprising one or more credentials of the user and a description of the browsing actions of the user, wherein details related to the user are recorded by using the credentials;

b. a Tag Cluster Generator Module for creating, one or more clusters of tags based on a predetermined machine learning clustering technique; and c. a Skill Matrix Generator Module for analyzing the one or more cluster of tags to derive a plurality of attributes and calculating a count for each of the derived attributes, the count being calculated based on at least one of:

(i) amount of time spent by the user in respective technology domain, and (ii) number of linkages between tags created b the user and tags created b a plurality of other users, and generating a skill matrix of a user based on the- count of each of the derived plurality of attributes and on the recorded details of the user.

12. The system of claim 11, wherein the Tag Cloud Management Module is further configured to authenticate the user based on at least one authorization detail of the user.

13. The system of claim 12, wherein the Tag Cloud Management Module is further configured to associate the at least one authorization detail of the user to each of the one or more tags created by the user.

14. The system of claim 11, wherein the Skill Matrix Generator Module further comprising:

a. a Skill Classification Component configured to identify one or more technology domains in which the user is active, by analyzing the one or more clusters of tags;

b. a Motivation Index Component configured to determine the motivation of the user in the identified one or more technology domains by evaluating the number of one or more tags created by the user corresponding to the identified one or more technology domains;

c. a Collaboration Index Component configured to evaluate the collaboration of the user in the identified one or more technology domains by determining the number of one or more collaborative tags created by the user, wherein the one or more collaborative tags refers to one or more tags created by other users corresponding to the identified one or more technology domains; and d. a Skill Maturity Component configured to compute the amount of time the user has spent in each of the identified one or more technology domains.

15. The system of claim 11, wherein the Skill Matrix Generator Module is further configured to create a graph, by plotting the generated skill matrix of a user in an n-dimensional co-ordinate graph.

* * * * *